(12) United States Patent
Kalkunte

(10) Patent No.: US 8,976,697 B2
(45) Date of Patent: Mar. 10, 2015

(54) NETWORK STATUS MAPPING

(71) Applicant: Broadcom Corporation, Irvine, CA (US)

(72) Inventor: Mohan Kalkunte, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 127 days.

(21) Appl. No.: 13/716,871

(22) Filed: Dec. 17, 2012

(65) Prior Publication Data

US 2014/0169189 A1 Jun. 19, 2014

(51) Int. Cl.
*H04L 1/00* (2006.01)
*H04L 12/26* (2006.01)
*H04L 12/28* (2006.01)

(52) U.S. Cl.
CPC ............ *H04L 43/0882* (2013.01); *H04L 43/10* (2013.01)
USPC .......................................................... 370/252

(58) Field of Classification Search
USPC .................................................. 370/241–255
See application file for complete search history.

(56) References Cited

U.S. PATENT DOCUMENTS

| 2005/0099948 | A1* | 5/2005 | Wakumoto et al. | 370/236 |
| 2007/0047446 | A1* | 3/2007 | Dalal et al. | 370/237 |
| 2012/0250505 | A1* | 10/2012 | Brolin | 370/230.1 |

* cited by examiner

*Primary Examiner* — Chi H Pham
*Assistant Examiner* — Voster Preval
(74) *Attorney, Agent, or Firm* — Oblon, McClelland, Maier & Neustadt, L.L.P.

(57) ABSTRACT

Embodiments of the present disclosure provide systems and methods for network status mapping. Such an exemplary system and method involves inserting a network map tag in a flow set of packets in a computer network and receiving a response to the network map tag from a network element that includes populated fields of the network map tag comprising a field to identify a network element, a field to identify the outgoing port of the network element, a field to identify queue of the outgoing port; and a status field for the queue of the outgoing port.

20 Claims, 6 Drawing Sheets

| NETWORK ELEMENT ID (12b) | PORT ID (8b) | QUEUE ID (8b) | CNG (2b) | RESVD (8b) |
|---|---|---|---|---|

NETWORK STATUS MAPPING

BACKGROUND

In computer networks, packets may be sent to their respective destinations via various paths. If multiple stations send packets along the same nodes or hops, congestion may occur at these nodes or hops. Also, congestion may result from speed mismatches between network input and output ports or links. Such congestion may slow down the transmission of the packets and/or result in some of the packets being lost.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Embodiments of the present disclosure provide systems and methods for network status mapping. Such an exemplary system and method involves inserting a network map tag in a flow set of packets in a computer network and receiving a response to the network map tag. In some embodiments, the response from a network element includes populated fields of the network map tag comprising a field to identify a network element, a field to identify the outgoing port of the network element, a field to identify a queue of the outgoing port; and a status field for the queue of the outgoing port. Therefore, a network controller in a computer network can monitor congestion status of network elements in the network and choose a path for forwarding packets based on a network congestion map formed from compiled congestion information, in one embodiment, among others.

Figure 1:
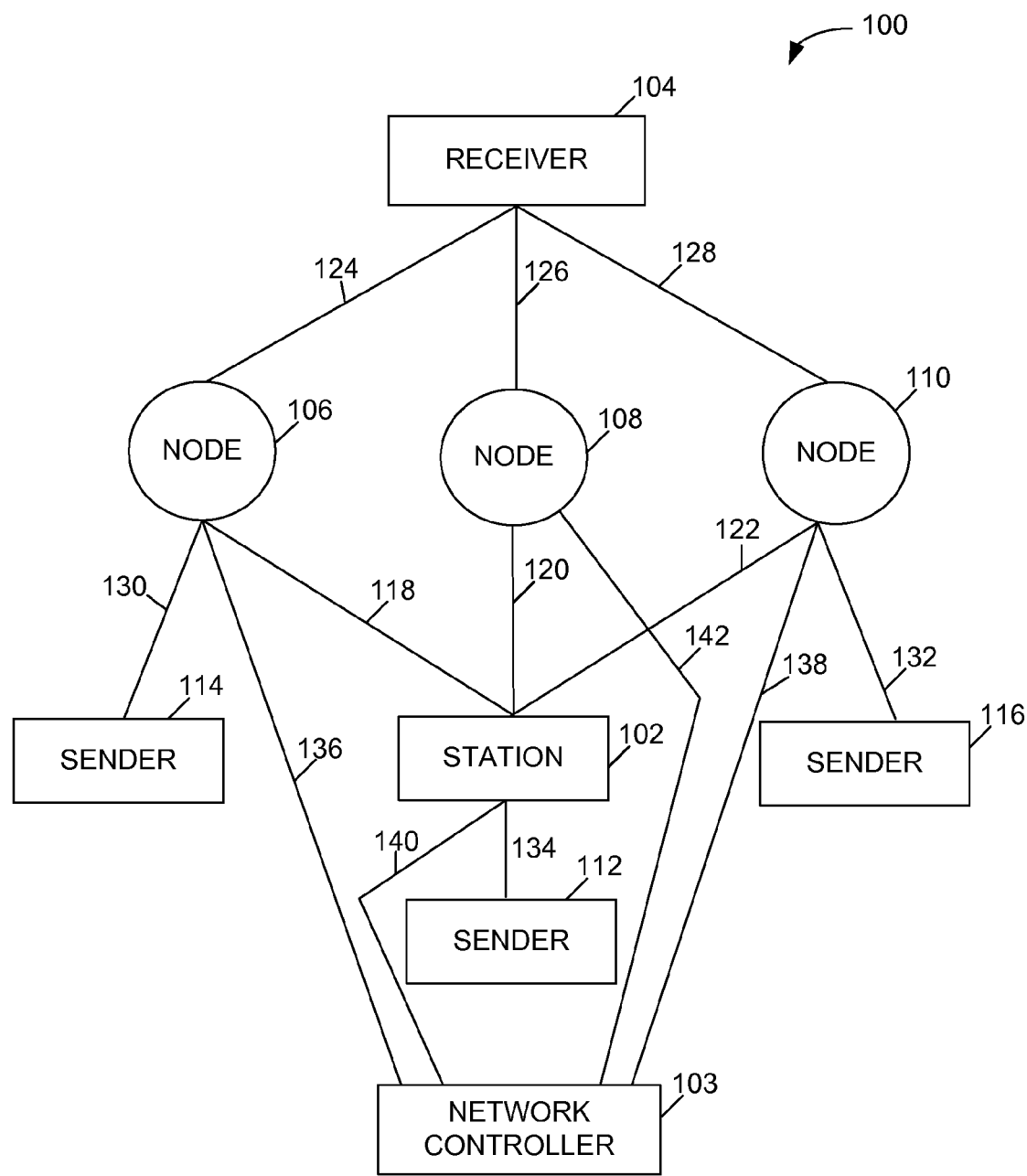
FIG. 1 is a diagram of a computer network according to an exemplary embodiment of the present disclosure.

FIG. 1 is a diagram of a computer network 100 according to an exemplary embodiment. The network 100 may include, for example, a mesh network topology or a partial mesh network topology with multiple routes for messages to travel from source to destination. The network 100 may include a wired (guided) network, using twisted pairs, coaxial cables, or optical fibers, or wireless (unguided) network, or any combination of these, according to example embodiments. The network 100 may include a packet-switched network, in which stations break messages up into packets and send these packets, one at a time, into the network 100. The network 100 may utilize a virtual circuit approach to routing packets, in which a sending station follows forwarding rules for each packet before sending the packet into the network. In some embodiments, the network 100 may be a Layer 2 and/or Layer 3 network, such as a data center network (e.g., private or public cloud).

In an example embodiment, the packets originating from a network element or given station may be hashed and bound to flow sets based on fields in and/or attributes of the respective packets. A component in the network 100, such as a router, switch, or switch fabric, may identify the flow set for each packet by hashing certain packet fields for the given packet. A flow set may be considered a set of state attributes (such as active, ingress port, path ID, move counter, and/or time stamp, discussed below) bound to a macroflow. Flows that hash to the same flow set may be considered to belong to a same macroflow, where a macroflow is a collection of smaller microflows.

Packets that hash to the same flow set, and/or macroflows belonging to a flow set, may be assigned to a same path through the network 100 by a network controller 103 or other network device such as a router, switch, or switch fabric, unless the path assignment maintained by the flow set is changed and/or the flow set is rerouted, in various embodiments. A path assignment may include, for example, a series of next hops, such as in an equal cost multipath approach, a link aggregation group (LAG) member, or a trunk member (such as HiGig trunks), according to example embodiments.

The network 100 may include various network elements, including network station 102. The station 102 may include any type of computing device, such as a server, gateway, router, switch, or relay node, according to example embodiments. The station 102 may have packets to send to a receiver 104 through the network 100. The receiver 104 may also include any type of computing device, such as a server, gateway, router, switch, relay node, personal computer, laptop or notebook computer, smartphone, personal digital assistant (PDA), or cellular telephone, according to example embodiments.

The network station 102 may receive forwarding rules from a network controller 103 and may apply those rules to assign a path via which to send the packets to the receiver 104. A path may include a series of hops through specified nodes in the network 100. The paths to the receiver 104 may include any number of nodes 106, 108, 110 which store and forward the packets along the path to the receiver 104. The nodes 106, 108, 110 may also include any type of computing device, such as a server, gateway, router, switch, or network station according to example embodiments. While three nodes 106, 108, 110 are shown FIG. 1, with only single-hop paths, any number of nodes 106, 108, 110 may be included in the network 100, and the network 100 may include any number of hops between the station 102 and the receiver 104. In various embodiments, networks are multi-pathed between station end points to increase network bi-section bandwidth.

The network station 102 may receive the packets from a source 112. The station 102 may include a plurality of ports, and may receive the packets from the source 112 via one or more of the ports. The source 112 may also include any type of computing device, such as a server, gateway, router, switch, relay node, personal computer, laptop or notebook computer, smartphone, personal digital assistant (PDA), or cellular telephone, according to example embodiments.

The network controller 103 may determine an optimal path for each flow, including packets received from source 112 destined for receiver 104, based on a multitude of criteria and convey this information to the network station 102. Accordingly, the source 112 may send packets to the station 102 as parts of flow sets.

The network station 102 may contend with other senders 114, 116 for resources in the network 100. The senders 114, 116 may also include any type of computing device, such as a server, gateway, router, switch, relay node, personal computer, laptop or notebook computer, smartphone, personal digital assistant (PDA), or cellular telephone, according to example embodiments. The senders 114, 116 may send packets to the nodes 106, 108, 110. The station 102, receiver 104, nodes 106, 108, 110, source 112, and senders 114, 116 may communicate via links 118, 120, 122, 124, 126, 128, 130, 132, 134. The links 118, 120, 122, 124, 126, 128, 130, 132, 134 may include wired (guided) or wireless (unguided) media. The station 102, receiver 104, nodes 106, 108, 110, source 112, and senders 114, 116 may communicate via the links 118, 120, 122, 124, 126, 128, 130, 132, 134 according to various protocols, such as Ethernet (IEEE 802.3), Wireless Local Area Networks (802.11), Bluetooth (802.15), or Worldwide Interoperability for Microwave Access (802.16), as non-limiting examples. The network controller 103 and station 102, among others, may communicate via the links 136, 138, 140, 142 in addition to the links described above.

Congestion may occur when a node 106, 108, 110 is receiving packets from both a sender 114, 116, and the station 102, for example. For example, if both the station 102 and the sender 114 are sending packets to the node 106, the node 106 may be unable to process and forward the packets at the same rates as the sum of the station 102 and the sender 114. The latency or delay of the paths via which the station 102 and/or sender 114 are sending packets to the receiver 104 may increase, resulting in slower packet delivery, and some packets may be dropped, as the packets exceed the node's 106 buffer capacity.

The network controller 103 may become aware of the congestion and reprogram a flow set table used by network station 102 that associates flow sets to particular paths that are used to reach respective destinations. Accordingly, the network controller 103 may reassign a flow set from a first forwarding path or link (that is congested) to an alternative forwarding path or link. By having visibility within the network 100, the network controller 103 is equipped to identify if a network element is experiencing congestion and re-balance the assignment of flows to network paths. Accordingly, the network controller 102 may be part of a software defined networking (SDN) architecture.

Therefore, the network station 102 may hash fields of a packet to determine a flow set (to which the packet is a member) and then use the table to identify a path to be used in routing the packet. Examples of hashing functions which the station 102 may perform to obtain the hash value may include, for example, CRC16, CRC32, XOR operations, and/or Pearson's hash, according to example embodiments. Packets that hash to a given flow set may have the same source address and destination address. Packets in a flow set may also have consecutive sequence numbers; the receiver 104 may use the sequence numbers to put the message, which was broken down into packets, back into its original order, according to an example embodiment.

In one embodiment, the network controller 103 causes a network map tag to be sent as part of a flow so that the network controller 103 can acquire useful status information on the network and make intelligent routing or forwarding decisions. By knowing a state of the network 100, including congestion statuses, or other metrics, at a port level, a queue level, and/or other desired level of granularity for network elements, the network controller 103 can obtain a global view of the network 100. Accordingly, embodiments of the present disclosure are directed to acquiring such status information within the network 100. In particular, an exemplary network controller 103 may reroute packets based on a network map generated from status information returned from network map tags in accordance with embodiments of the present disclosure.

Figure 2:
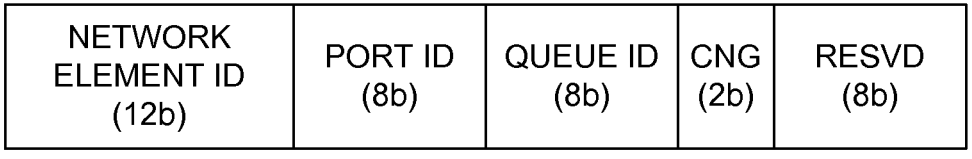
FIG. 2 is a block diagram of a network map tag according to an exemplary embodiment of the present disclosure.

FIG. 2 is a block diagram of a network map tag 200 according to an example non-limiting embodiment. In this example, the network map tag 200 contains a network element identification (ID) field (such as a switch identification number when applicable), a port ID field, a queue ID field, congestion (CNG) status field, and a reserved (Rsvd) field. Also, in this example, the sizes of the network element ID field, port ID field, a queue ID field, CNG field, and Rsvd field are 12 bits, 8 bits, 4 bits, 2 bits, and 8 bits respectively. The 12-bit size of the network element ID field allows for 4096 network elements to be identified in the network 100. However, the size of the network element ID field (or any other field) may be increased or decreased within a network map tag 200 to account for network particularities. Accordingly, the overall size of the network map tag 200 may vary within different embodiments. Correspondingly, the 8-bit size of the port field allows for 256 ports to be identified; the 4-bit queue ID field allows for 16 queues to be identified (per port); and the 2-bit CNG field allows for 4 levels of congestion to be identified in this example. Again, in different embodiments, different levels of congestion may be identified and/or different types of status information may be acquired.

Consider that the network map tag 200 may be inserted in a flow of packets the flow or stream of packets may be received by a network element having a network element ID. In one embodiment, each of the network elements in the network 100 that are capable of providing network status information are associated with network element IDs. After receiving the network map tag 200, the network element, such as network station 102, forwards the flow within the network 100. Accordingly, the flow is directed to one of a number of physical ports of the network station 102 and associated with the port is a number of queues. After forwarding the flow, the network map tag 200 is populated with the information associated with the outgoing port and queue by the network station 102.

In accordance with embodiments of the present disclosure, the network controller 103 is configured to acquire the network statuses of the queues for the network station 102 and other network elements in the network 100. Accordingly, the network station 102 qualifies the congestion status of a queue used to forward the packet carrying the network map tag 200 and populates the CNG field of the network map tag 200 with the appropriate status.

In one example, the network station 102 may be programmed by the network controller 103 to assign one of three congestion levels to indicate the current congestion status: High, Medium, or Low. Accordingly, if the congestion status is 75% full, then the level may be assigned as 2 (High) and a 10 bit representation is populated in the CNG field. If the congestion status at the queue within the port is at 10% full capacity, then the level may be assigned as 0 (Low) and a 00 bit representation is populated in the CNG field. Correspondingly, a middling level between the Low and High levels may be assigned as a 01 bit representation indicating a Medium level.

Then, the network map tag 200 is populated with identifiers for the network station, the port of the network station, the queue of the port, and a congestion status for the queue. A copy of a packet containing the network map tag 200 is sent to the network controller 103 from the network station 102, where the network controller 103 (or an agent of the network controller) is responsible for constructing a network congestion map or table (e.g., flow-path-congestion table) which can be used by the network controller 103 to make decisions on flow load balancing, among other uses.

Therefore, if the congestion status of a queue of a network element is ¾ths full, the network controller 103 may elect to choose or reroute to a different path (at a low or medium CGN level) than one employing the congested queue. Accordingly, status information returned to the network controller 103 as populated network map tags from network elements allow the network controller 103 to become aware of the network conditions and statuses of the network elements.

One possible approach of introducing the network map tag 200 in a flow of packets is to insert the tag within a layer 2 packet or frame. In one exemplary embodiment, the network map tag 200 may be inserted after a VLAN tag of the layer 2 packet using a private Ethertype. Another possible approach is to insert the network map tag 200 in the IP options field of a layer 3 packet.

In one embodiment, the packet containing the network map tag 200 may be a probe packet specifically generated to carry the network map tag 200 or may be a packet containing a payload which is used to piggyback the network map tag 200. For the probe packet, a header of the packet may be marked to indicate that the packet is a probe which will allow for network elements to recognize the probe. While the term, "packet" is used herein, "packet" may also include frames or other formats which include data and other fields which may be used to determine a flow set.

In accordance with embodiments of the present disclosure, the rate at which network map tags 200 are inserted within network packets is programmable by the network controller 103. For example, the rate may occur at periodic or random intervals, according to various exemplary embodiments. Also, network elements, such as network switches, may have authority to decide when a network map tag 200 should be inserted in a flow to comply with the forwarding rules (e.g., to satisfy a desired sampling rate), since a sufficient rate of packet sampling is desired such that sampling of network conditions is valid. This includes possibly inserting the network map tag 200 in every layer 2 packet of a flow.

For networks with statistically hashed flows, the network map tag 200 may be carried by probe packets for a flow, in some embodiments. Accordingly, a network controller 103 may request a probe packet on a per flow basis, since different flows may take different paths. On the other hand, networks with dynamically hashed flows, the network map tag 200 may be inserted into sampled packets of a flow.

In one embodiment, it is the network controller 103 that inserts the network map tag 200 in a packet. In such an arrangement, a server administrator may then implement intelligent algorithms at the end points to manage traffic. Alternatively, a network element, such as a switch, can be programmed to introduce the network map tag 200 in a packet of a flow. Accordingly, a first network element in a path assigned to a flow set may be instructed to introduce and send the network map tag 200. In such an arrangement, a network administrator can implement intelligent algorithms at the network element, such as a switch, to manage traffic.

For instance, a flow set may be assigned, by the network controller 103, to a particular path which will be used to reach its destination, such as receiver 104. The path may be associated with an index number, which may compared to a flow set table which indicates which nodes 106, 108, 110 or hops the packet (carrying the network map tag) will travel through to reach its destination for the path (having the index number). Alternatively, the flow set table may include addresses for each node 106, 108, 110 or hop the packet will travel through, as well as the address of the destination, which may be the receiver 104, according to example embodiments. The path ID may have been determined, for example, by the network controller 103 performing a hashing function on fields in the packet, such as a source address field and a destination address field. Accordingly, the network controller 103 may hash the fields in the packet to identify a flow set for the packet.

Correspondingly, the network controller 103 may provide or update the applicable flow set table to network elements, such as station 102, to be used in forwarding packets within flow sets. Additionally, as the network controller 103 determines that an active path is congested for a flow set, the network controller 103 may reassign the flow set to a different path.

Figure 3:
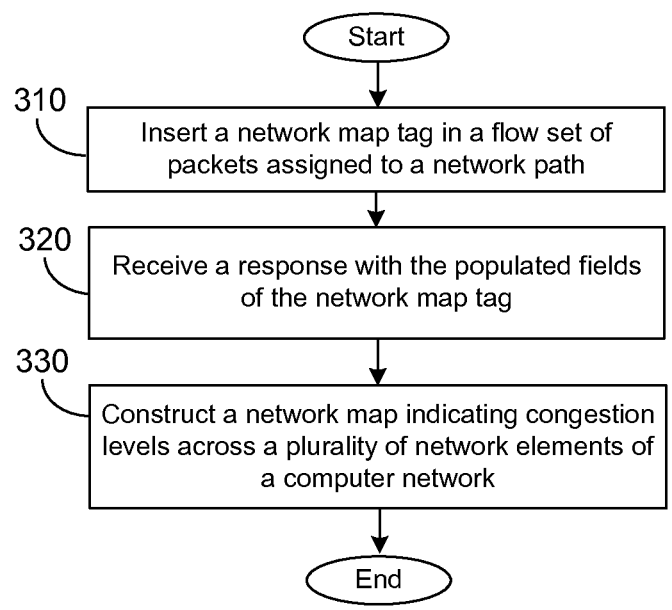
FIG. 3 is a flow chart diagram describing an exemplary process for monitoring network status levels within a computer network according to embodiments of the present disclosure.
Figure 6:
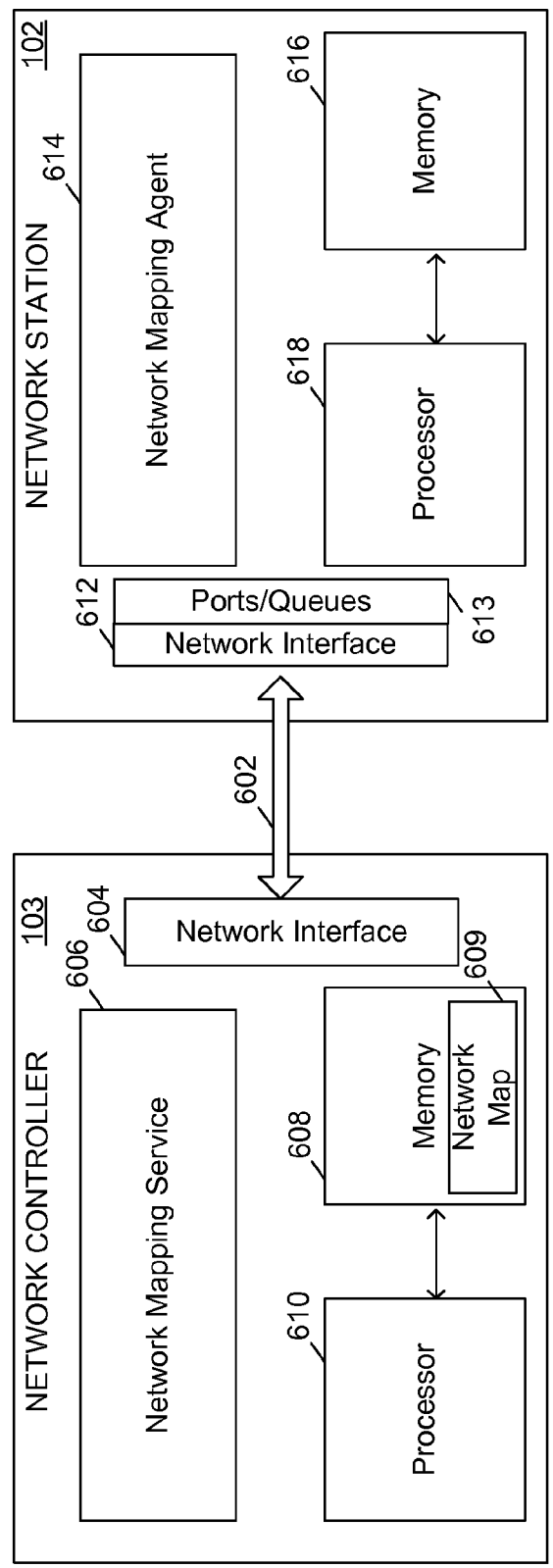
FIG. 6 is a block diagram depicting a network controller and network station according to an exemplary embodiment of the present disclosure.

Referring now to FIG. 3, a flow chart is provided showing a process (e.g., algorithm) for monitoring network status levels within a computer network according to an exemplary embodiment. The flow chart of FIG. 3 provides one example of the operation of a portion of the network controller 103 according to various embodiments. It is understood that the flow chart of FIG. 3 provides merely an example of the many different types of functional arrangements that may be employed to implement the operation of the portion of the network controller 103 as described herein, including a network mapping service 606 (FIG. 6).

In this example, a network controller 103 may insert (310) a network map tag 200 in a flow set of packets assigned to a network path. The network map tag 200 includes a field to identify a network element (e.g., network station 102), a field to identify an outgoing port of the network element, a queue of the outgoing port; and a congestion field for the queue of the outgoing port, in one embodiment. Accordingly, the network map tag 200 is intended to be carried along the flow and will be received by a network element, such as a network station 102, in a path.

In one embodiment, the network station 102 is programmed to recognize the network map tag of the packet and prepare a response for the network controller 103 after forwarding the packet as part of the flow set in accordance with forwarding rules being implemented by the network station 102. If by chance a particular network element receives the packet and is not configured to recognize the network map tag, the network element may then forward the packet without attempting to prepare a response and populate the network map tag fields.

Such a response prepared by the network station 102 includes the populated fields of the network map tag 200 in which the network station 102 is identified. Also, the port used to forward the packet, the queue of the port used to forward the packet, and the congestion level for the queue of the outgoing port are each identified. Accordingly, each network element that receives the network map tag 200 along a path may also provide updated status information to the network controller. Subsequently, when any of the network elements receives a new network map tag, then the network controller 103 is provided with another updated status for the network 100.

Therefore, in FIG. 3, the network controller 103 receives (320) the response with the populated fields of the network map tag and then compiles or constructs (330) a network map (a/k/a network status map or network congestion map) indicating congestion levels across a plurality of network elements of the computer network 100. In one embodiment, as discussed, the network map may be in the form of a table with cells for identification of network elements in the computer network, identification of an outgoing port for each of the network elements, identification of a queue for each of the outgoing port; and identification of a network congestion status for each of the queues. In some embodiments, the status information obtained from network map tag 200 may also be used to graphically depict a diagram or map of network architecture with current network status levels represented.

According to various embodiments, a generated network map therefore may include each network element, each port, each queue, and their corresponding condition levels. This information may be the basis for performing rerouting and forwarding decisions by the network controller 103 (or other network element having access to the network map). For example, by considering a current mapping of a network 100, a network condition may be detected on a network element used in a particular path, and as a result, a decision may be made to reroute a flow set using a different path.

Figure 4:
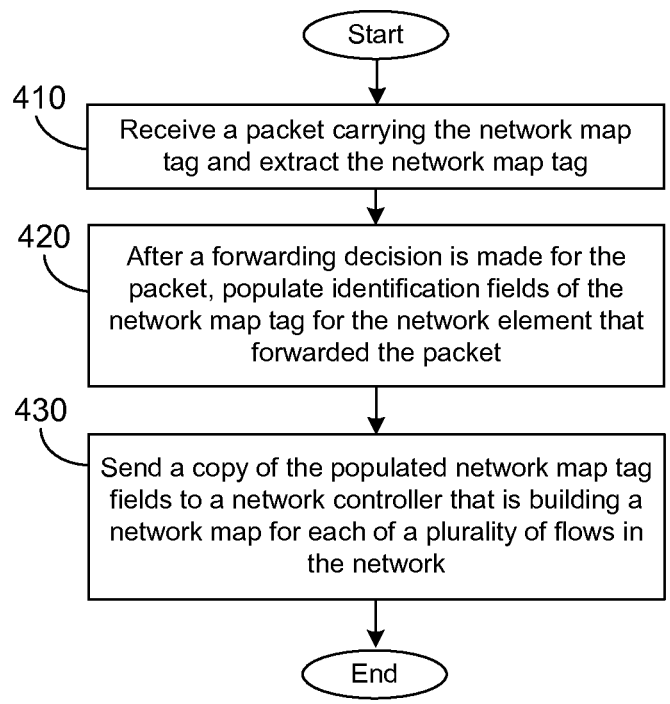
FIG. 4 is a flow chart diagram describing an exemplary process for responding to a network map tag according to embodiments of the present disclosure.

Next, FIG. 4 is a flow chart showing a process (e.g., algorithm) for responding to a network map tag according to an exemplary embodiment. The flow chart of FIG. 4 provides one example of the operation of a portion of the network controller 103 according to various embodiments. It is understood that the flow chart of FIG. 4 provides merely an example of the many different types of functional arrangements that may be employed to implement the operation of the portion of the network station 102 as described herein, including a network mapping agent 614 (FIG. 6).

In this example, a network controller 103 sends a probe packet or a network map tag 200 is inserted in a sampled packet of a flow. Accordingly, a network element, such as the network station 102, receives (410) a packet carrying the network map tag and extracts the network map tag 200. After a forwarding decision is made for the packet, the network station 102 populates (420) identification fields of the network map tag 200, which may include an ID for the network station 102 (or other network element), an outgoing port ID, and a queue ID. The network station 102 also populates a congestion level (e.g., low, medium, high) for the queue. The congestion level may depend on buffer sizes and associated queue levels for the network element. Then, the network station 102 sends (430) a copy of the populated network map tag fields to the network controller 103 so that the network controller 103 can build a network map for each of a plurality of flows in the network 100. Such a network map, (e.g., flow-network map table) may be useful for many software defined networking applications.

Figure 5:
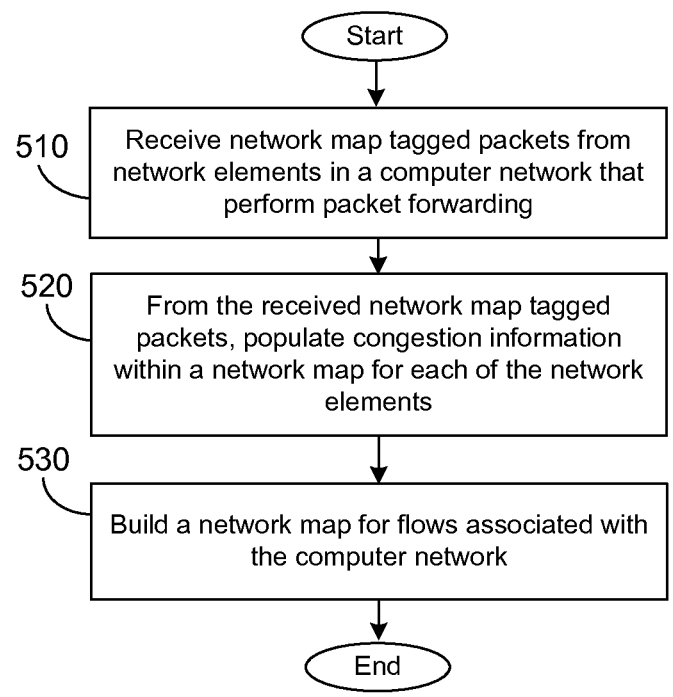
FIG. 5 is a flow chart diagram describing an exemplary process for building a network map for flows associated with a computer network according to embodiments of the present disclosure.

FIG. 5 is a flow chart showing a process according to an example embodiment. In this example, a network controller 103 (or agent of the network controller 103) receives (510) network map tagged packets from network elements in a computer network 100 that perform packet forwarding. From the received network map tagged packets, the network controller 103 populates (520) congestion information within a network map for each of the network elements and builds (530) a network map for flows associated with the computer network. It is understood that the flow chart of FIG. 5 provides merely an example of the many different types of functional arrangements that may be employed to implement the operation of the portion of the network controller 103 as described herein, including a network mapping service 606 (FIG. 6).

Referring now to FIG. 6, a block diagram is depicted showing the network controller 103 and a network element (network station 102) according to an exemplary embodiment. Along with the network controller device 103 and a network station 102, there is shown a network connection 602; network interface 604, a network mapping service 606, a memory 608, and a processor 610 for the network controller 103; and a network interface 612 (associated with ports/queues 613), remote network mapping agent 614, a memory 616; and a processor 618 for the network station 102.

The network controller 103 may comprise suitable logic, circuitry, code, and/or interfaces that may enable monitoring of network status levels within network elements of a computer network 100 via a network connection 602, such as network mapping service 606. As such a network element, the network station 102 may also comprise suitable logic, circuitry, code, and/or interfaces that may enable provisioning of network status levels to the network controller 103 via the network connection 602, such as the remote network mapping agent 614.

In particular, the network mapping service 606 may comprise a logical and/or software entity that may be integrated within an operating system (OS) running in the network controller 103 to generate network map(s) 609 in memory. Correspondingly, network mapping agent 614 may comprise a logical and/or software entity that may be integrated within an OS running in the network station 102; and/or a logical and/or software entity that may be integrated within a network interface controller (NIC) which may be running in the network station 102.

Additionally, the processor 610 (of the network controller 103) may comprise suitable logic, circuitry, code, and/or interfaces that may enable performing control and/or processing operations in the network controller 103. The present disclosure may not be limited to a specific processor, but may comprise for example, a general purpose processor, a specialized processor or any combination of suitable hardware, firmware, software and/or code, which may be enabled to support and/or control operations of the network controller 103. The memory 608 may comprise suitable logic, circuitry, code, and/or interfaces that may enable permanent and/or non-permanent storage and fetch of data and/or code used by the processor 610, for example, during network mapping related processing operations. In this regard, the memory 608 may comprise various combinations of memory technologies, including, for example, read-only memory (ROM), random access memory (RAM), and/or Flash memory.

The network mapping agent 614 may comprise a dedicated entity that is operable to enable performing and/or supporting network mapping operations in the network station 102, including provisioning of network status metrics. The network mapping agent 614 may comprise a logical and/or software entity that may be integrated within an OS running in the network station 102; and/or a logical and/or software entity that may be integrated within a network interface controller (NIC) which may be running in the network station 104.

The processor 618 (of the network station 102) may comprise suitable logic, circuitry, code, and/or interfaces that may enable performing control and/or processing operations in the network station 102. The present disclosure may not be limited to a specific processor, but may comprise for example, a general purpose processor, a specialized processor or any combination of suitable hardware, firmware, software and/or code, which may be enabled to support network mapping operations in accordance with the various embodiments of the present disclosure. The memory 616 may comprise suitable logic, circuitry, code, and/or interfaces that may enable permanent and/or non-permanent storage and fetch of data and/or or code used by the processor 618, for example, during network mapping related processing operations. In this regard, the memory 616 may comprise various combinations of memory technologies, including, for example, read-only memory (ROM), random access memory (RAM), and/or Flash memory.

The network connection 602 may comprise networking interfaces and/or link that may enable communicating network mapping based traffic between network devices, for example the network controller 103, and network elements, such as the network station 102. As a non-limiting example, the network connection 602 may comprise Ethernet (IEEE 802.3) based networking connections, which may operable to communicate network mapping and/or non-network mapping traffic packets, to and/or from the network devices 102, 103, to facilitate exchange of data between the network station 102 and the network controller 103.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

In the context of this document, a computer program product or "computer-readable medium" can be any means that can contain, store, communicate, propagate, or transport the computer program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments includes embodying the functionality of certain embodiments of the present disclosure in logic embodied in hardware or software-configured mediums.

Method or process steps may be performed by one or more programmable processors executing a computer program to perform functions by operating on input data and generating output. Method or process steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks.

To provide for interaction with a user, implementations may be implemented on a computer having a display device, e.g., a cathode ray tube (CRT) liquid crystal display (LCD) monitor, etc., for displaying information to the user and a keyboard and a pointing device, e.g., a mouse or a trackball, by which the user can provide input to the computer, including a touch screen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include, but are not limited to, a local area network (LAN) and a wide area network (WAN), e.g., the Internet.

Any process descriptions or blocks in flow charts should be understood as representing modules, segments, or portions of code which include one or more executable instructions for implementing specific logical functions or steps in the process, and alternate implementations are included within the scope of embodiments of the present disclosure in which functions may be executed out of order from that shown or discussed, including substantially concurrently or in reverse order, depending on the functionality involved, as would be understood by those reasonably skilled in the art.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the present disclosure.

The invention claimed is:

1. A method comprising:
    inserting a network map tag in a flow set of packets of a computer network, wherein the network map tag includes a plurality of fields including a field to identify a network element, a field to identify an outgoing port of the network element, a field to identify a queue of the outgoing port, and a congestion field for the queue of the outgoing port;
    receiving, by a network controller, a response to the network map tag from the network element that extracted the network map tag, populated the plurality of fields and forwarded a packet carrying the network map tag along a path assigned to the flow set; and
    compiling a network map indicating congestion levels across a plurality of network elements of the computer network based on at least the response received from the network element.

2. The method of claim 1, wherein the packet carrying the network map tag comprises a probe packet.

3. The method of claim 2, wherein the network controller, a network switch, or a sending station generates the probe packet.

4. The method of claim 1, wherein a network switch inserts the network map tag in the flow set, wherein the packet carrying the network map tag comprises a packet having a payload from a remote sender.

5. The method of claim 1, wherein a rate at which the network map tag is introduced in the flow set of packets is programmable by the network controller.

6. The method of claim 1, wherein the congestion field indicates a current level of congestion for the queue of the outgoing port of the network element.

7. The method of claim 1, wherein the network map includes identification of network elements in the computer network, identification of an outgoing port for each of the network elements, identification of a queue for each of the outgoing port; and identification of a network congestion status for each of the queues.

8. The method of claim 1, further comprising modifying forwarding rules based on content of network map tag and providing the modified forwarding rules to a network station that performs routing within a computer network, wherein the network station updates its forwarding rules with the modified forwarding rules.

9. A method comprising:
   inserting a network map tag in a flow set of packets of a computer network, wherein the network map tag includes a plurality of fields including a field to identify a network element, a field to identify an outgoing port of the network element, a field to identify a queue of the outgoing port; and a status field for the queue of the outgoing port;
   receiving, by a network controller, a response to the network map tag from the network element that extracted the network map tag, populated the plurality of fields and forwarded a packet carrying the network map tag along a path assigned to the flow set; and
   determining network forwarding rules based on at least the response received from the network element.

10. The method of claim 9, wherein the packet carrying the network map tag comprises a probe packet.

11. The method of claim 10, wherein the network controller, a network switch, or a sending station generates the probe packet.

12. The method of claim 9, wherein a network switch inserts the network map tag in the flow set, wherein the packet carrying the network map tag comprises a packet having a payload from a remote sender.

13. The method of claim 9, wherein a rate at which the network map tag is introduced in the flow set of packets is programmable by the network controller.

14. The method of claim 9, wherein the status field indicates a current level of congestion for the queue of the outgoing port of the network element.

15. A network controller system comprising:
   a processor configured to insert a network map tag in a flow set of packets of a computer network, wherein the network map tag includes a plurality of fields including a field to identify a network element, a field to identify an outgoing port of the network element, a field to identify a queue of the outgoing port; and a status field for the queue of the outgoing port; and
   a communication interface configured to receive a response to the network map tag from the network element that extracted the network map tag, populated the plurality of fields and forwarded a packet carrying the network map tag along a path assigned to the flow set.

16. The system of claim 15, wherein a rate at which the network map tag is introduced in the flow set of packets is programmable.

17. The system of claim 15, wherein the status field indicates a current level of congestion for the queue of the outgoing port of the network element.

18. The system of claim 15, wherein the processor is configured to construct a network map indicating congestion levels across a plurality of network elements of the computer network.

19. The system of claim 18, wherein the network map includes identification of network elements in the computer network, identification of an outgoing port for each of the network elements, identification of a queue for each outgoing port; and identification of a network congestion status for each queue.

20. The system of claim 15, wherein the processor is configured to determine network forwarding rules based on at least the response received from the network element.

* * * * *